United States Patent Office 3,575,970
Patented Apr. 20, 1971

3,575,970
PROCESS FOR PREPARATION OF 7-AMINO-CEPHALOSPORANIC ACID COMPOUNDS
Helmut Wilhelm Otto Weissenburger, Rijswijk, and Marcelus Gijsbertus van der Hoeven, Den Haag, The Netherlands, assignors to Koninklijke Nederbandsche Gist-en Spiritusfabriek N.V., Delft, The Netherlands
No Drawing. Continuation-in-part of application Ser. No. 681,002, Nov. 6, 1967, which is a continuation-in-part of application Ser. No. 622,907, Mar. 14, 1967. This application Oct. 20, 1969, Ser. No. 867,888
Claims priority, application Netherlands, Aug. 7, 1967, 6710835; Oct. 11, 1967, 6713809
Int. Cl. C07d 99/24
U.S. Cl. 260—243          15 Claims

ABSTRACT OF THE DISCLOSURE

A novel process for the preparation of a compound selected from the group consisting of 7-amino-cephalosporanic acid and its derivatives in high yields by chemical removal of the acyl radical of the corresponding 7-acyl-amino-cephalosporanic compounds which are useful intermediates.

PRIOR APPLICATION

The present applicatio is a continuation-in-part application of our copending, commonly assigned United States patent application Ser. No. 681,002 filed Nov. 6, 1967, now U.S. patent No. 3,499,909 which in turn is a continuation-in-part application of our copending, commonly assigned United States application Ser. No. 622,907 filed March 14, 1967, now abandoned.

PRIOR ART

Dutch patent specification No. 6,401,421 and No. 6,531,095 described a preparation of 7 - amino-cephalosporanic acid and derivatives thereof which comprise (A) protecting the free amino and carboxylic acid groups of cephalosporin C and derivatives thereof of the formula

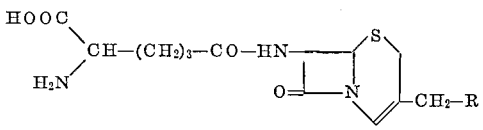

wherein R is acyloxy such as acetoxy in case of cephalosporin C or an hydroxy group forming a lactone with the 2-carboxyl group, preferably by converting cephalosporin C into the di-benzhydryl ester of N-phthaloyl-cephalosporin C, (B), converting the said protected product into an imino halide, preferably by reaction with a halogenating agent such as phosphorus pentachloride or phosphorus oxychloride in the presence of a tertiary amine such as triethylamine, pyridine or dimethylaniline, (C), reacting the imino halide with an alcohol such as methanol or ethanol to form the corresponding imino ether and (D), hydrolyzing the imino ether with water in the presence of a basic or acidic catalyst such as phosphoric acid or hydrochloric acid to form the corresponding carboxylic acid esters of 7-amino-cephalosporanic acid.

If the carboxylic acid groups of cephalosporin C had been esterified for instance with benzyl or benzhydryl groups respectively, the benzyl ester and the benzhydryl ester of 7-amino-cephalosporanic acid are obtained, from which the benzyl group can be removed by hydrogenolysis and the benzhydryl group by treatment with trifluoroacetic acid in anisole.

According to Dutch patent specification No. 6,513,095, after the saponification of the benzhydryl ester of 7-amino-cephalosporanic acid, trifluoroacetic acid is then further converted in a polar solvent with a tertiary amine into the trifluoroacetate, and 7-amino-cephalosporanic acid is crystallized from the solution.

OBJECTS OF THE INVENTION

It is an object of the invention to provide a novel process for the preparation of 7-amino-cephalosporanic acid and its derivatives in high yields and without the disadvantages of microbiological processes.

It is another object of the invention to provide an improved process for the preparation of 7-amino-cephalosporanic acid and its derivatives with few steps and higher yields due to the operating conditions.

These and other objects and advantages of the invention will become obvious from the following detailed description.

THE INVENTION

The novel process of the invention for the preparation of an amino acid selected from the group consisting of 7 - amino-cephalosporanic acid and its derivatives comprises (A) reacting an acyl amino acid compound of the formula

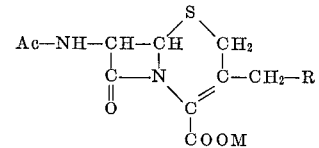

wherein Ac is the acyl of an organic carboxylic acid, preferably of 1 to 18 carbon atoms, R is selected from the group consisting of acyloxy of an organic carboxylic acid of 1 to 7 carbon atoms, OH and H, M is selected from the group consisting of hydrogen, metal cations and amine cations with a silyl compound of a formula selected from the group consisting of:

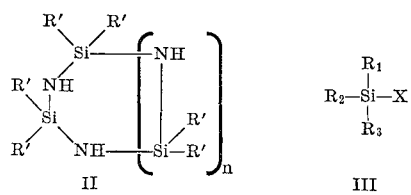

wherein $R_1$, $R_2$ and $R_3$ are selected from the group consisting of hydrogen, halogen, alkyl and haloalkyl of 1 to 7 carbon atoms and aryl, at least one of the said R's being other than halogen and hydrogen, R' is alkyl of 1 to 7 carbon atoms, n is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the corresponding silyl ester of the said acylamino acid, (B) reacting under anhydrous conditions the said silyl ester with an acid halide as a halogenating agent at a temperature below 0° C. to form the corresponding imino halide, (C), reacting the said imino halide at a temperature not greater than −20° C. with an alcohol selected from the group consisting of primary and secondary alcohols to form the corresponding imino ether, and (D) reacting the imino ether under acid conditions with a compound selected from the group consisting of water and hydroxyl containing compound to form the corresponding free amino acid.

The process of the invention unexpectedly gives high yields which may be of the order of 85% to 95% which is due to the use of silyl esters which may be prepared and converted without loss of material, especially if the reaction proceeds at the unusually low temperature of below −20° C., preferably −20 to −60° C., during the formation of the imino ether. This prevents splitting of the lactam bond. Moreover, the use of the silyl esters rather than the esters of Dutch patent specifications No. 6,401,421 and No. 6,531,095 simplifies the process since the silyl ester hydrolyzes simultaneously with the splitting of the double imino bond and avoids the separate step of splitting the 2-carboxylic acid ester required by the known process.

The formation of the silyl ester is effected by reacting under anhydrous conditions a silyl compound of Formula II or III with the free acylamino acid of Formula I or a salt thereof in the presence of an acid binding agent. Examples of suitable salts are alkali metal and alkaline earth metal salts such as potassium, sodium, calcium, etc.; ammonium salt; metal salts such as aluminum; amine salts such as trialkyl amines such as triethylamine, procaine, dibenzylamine, N-benzyl - β - phenethylamine, 1-ephenamine, N,N' - dibenzylethylenediamine, dehydroabietyl-amine, N- lower alkylpiperidines such as N-ethylpiperdine, N-benzyl-dehydroabiethylamine, etc. Preferably tertiary amine salts are used.

Examples of suitable acid binding agents are tertiary amines such as triethylamine, dimethylaniline, quinoline, lutidine, pyridine. The amount of tertiary amine used is preferably such that only a portion of the acid thus formed is bound. For example, the amount of tertiary amine for $PCl_5$ and a small excess of acid forming halogeno-silane derivative may be less than four equivalents, preferably less than three equivalents, whereby no separate hydrolysis is required.

Examples of suitable silyl compounds of Formula I are trimethyl chlorosilane, hexamethyl disilazane, triethyl chlorosilane, methyl trichlorosilane, dimethyl dichlorosilane, triethyl bromosilane, tri-n-propyl chlorosilane, bromomethyl dimethyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenyl chlorosilane, triphenyl fluorosilane, tri-o-tolyl chlorosilane, tri-p-dimethylaminophenyl chlorosilane, N-ethyl triethyl silylamine, hexaethyl disilazane, tri-phenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane, etc. The same effect is produced by hexa-alkylcyclotrisilazanes or octa-alkylcyclotetra-silazanes. Other suitable silylating agents are silylamides and silylureides such as trialkylsilyacetamide and a bis-trialkylsilylacetamide.

The imino compound is preferably an imino chloride or bromide which can be prepared by reacting the silyl ester of the acylamino acid with an acid halide as the halogenating agent such as phosphorus pentachloride, phosphorus pentabromide, phosphorus tribromide, oxalyl chloride, p-toluene sulfonic acid chloride, phosphorus oxychloride, phosgene, etc., under anhydrous conditions in the presence of acid binding agents at temperature preferably below 0° C. such as −10 to −40° C. The formation of the imino halide is preferably effected in an inert organic solvent such as methylene chloride, dichloroethane, chloroform, tetrachloroethane, nitromethane, diethyl ether, etc.

A very important step for the high yields of the process of the invention is the formation of the imino ether by reacting the imino halide, preferably under anhydrous conditions, with a primary or secondary alcohol at temperatures between −20 and −60° C., preferably about −40° C. Temperatures higher than −20° C. give a substantial reduction in yield.

Examples of suitable alcohols for forming the imino ethers are primary and secondary alcohols having the general formula $R_6OH$ in which $R_6$ is selected from the group consisting of (A) alkyl having 1 to 12 carbon atoms, preferably at least 3 carbon atoms, such as methanol, ethanol, propanol, isopropanol, n-butanol, amylalcohol, decanol, etc.; (B) phenylalkyl having 1 to 7 alkyl carbon atoms, such as benzylalcohol, 2-phenylethanol-1, etc.; (C) cycloalkyl, such as cycohexylalcohol, etc.; (D) hydroxyalkyl having 2 to 12 carbon atoms preferably 2 to 8 carbon atoms, such as ethylene glycol, 1,4-butanediol, 1,6-hexanediol, etc.; (E) alkoxyalkyl having 3 to 12 carbon atoms, such as 2-methoxyethanol, 2-isopropoxyethanol, 2-butoxyethanol, etc.; (F) aryloxyalkyl, having 2 to 7 carbon atoms in the aliphatic chain, such as 2-chlorophenoxyethanol, etc.; (G) aralkoxy alkyl having 2 to 7 carbon atoms in the aliphatic chain, such as 2-(p-methoxybenzyloxy)-ethanol, etc.; (H) hydroxyalkoxyalkyl having 4 to 7 carbon atoms, such as diglycol. Also, mixtures of these alcohols are suitable for forming the imino ethers. Alcohols having at least one primary OH group are preferred.

Of the imino ethers formed, the imino bond must finally be split, e.g. by mild hydrolysis or alcoholysis, especially if an excess of alcohol is used and hydrogen ions are present, for instance by use of less acid binder than is theoretically necessary for the binding of the acid liberated.

The separation of the free amino acid formed is effected by bringing the reaction mixture to, or in the vicinity of, the isoelectric point, in consequence of which crystallization takes place.

For optimum results, it is preferred to use high concentrations of the reactants. For example in the formation of the silyl esters, a 20 to 30%, preferably 25% by weight of the acylamino acid is suspended in an inert organic solvent and a base for the best results. The preferred base is dimethylaniline. Depending upon the specific starting material, the silane is employed preferably in a slight excess, i.e. 10 to 60%, above theoretical amounts. This enables the use of solvents which are not absolutely dry because trace amounts of water are removed therefrom by reacting with the excess silylating agent. If there are additional carboxyl groups present in the acyl chain of the starting material, additional silane will be needed to esterify the said carboxyl groups.

By way of example, a reaction scheme is illustrated in Table I.

TABLE I

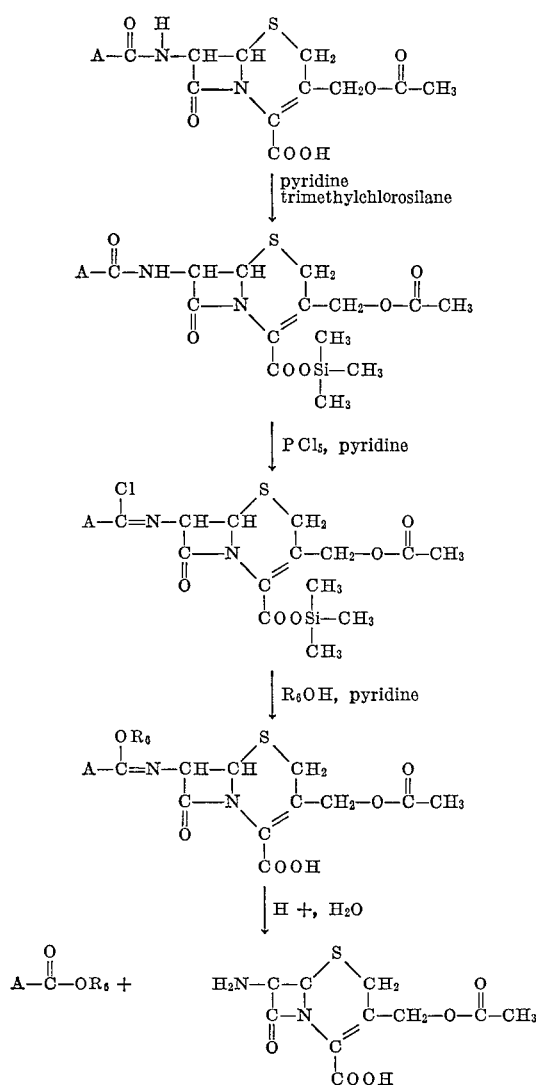

wherein A is the residue of an organic carboxylic acid of 1 to 18 carbon atoms devoid of the carboxyl and $R_6$ is the residue of an alcohol devoid of the OH groups.

Examples of suitable organic carboxylic acids for the starting acylamino acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopentyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-terbutylphenoxy acetic acid, 3-phenoxy propionic acid and 4-phenoxy butyric acid; heterocyclic carboxlic acids, such as 2-thienyl-acetic acid, furane-2-carboxylic acid, 5-terbutylfurane-2-carboxylic acid, 5-bromo-furane-2-carboxylic acid and nicotinic acids; β-ketoalkanoic acids, such as acetylacetic acid, propionyl-acetic acid and butrylacetic acid; amino acids, such as diethylaminoacetic acid and aspartic acid.

Examples of suitable cephalosporanic compounds suitable for use in the process of the invention can be found in the prior art such as British Pats. Nos. 847,375, 982,209, 1,014,883, 1,041,985, 1,051,746 and 1,064,495 and in U.S. Pats. Nos. 3,124,576, 3,227,709, 3,227,712, 3,234,223, 3,296,258, 3,093,638 and 3,207,755. The starting acylamino acid compound may contain any side chain acyl substituent as long as reactive groups of the side chain such as amino groups or carboxylic acid groups are blocked previous to the formation of the iminohalide, for instance by a silyl radical. The before mentioned silyl compounds can be used for the silylation. Further an amino group can be blocked by a lower alkyl, aryl or acyl radical. The aryl radicals, for example naphthyl or phenyl radicals may be unsubstituted or substituted by halogen atoms, or nitro, cyano, sulpho, carbamyl, esterified carboxyl, lower alkyl carboxyl or lower alkoxycarbonyl groups. Especially suitable are a 2:4-dinitrophenyl, a 2:4:6-trinitrophenyl, a 2:4-dinitro-6-methoxyphenyl, a 4-cyanophenyl or a 4-carbomethoxyphenyl radical. Acyl radicals are lower alkanoyl radicals with 1 to 6 carbon atoms for example acetyl propionyl or butyryl and also aroyl radicals, such as benzoyl, as well as benzoyl substituted by nitro, cyano or sulphogroups, halogen atoms or lower alkyl or lower alkoxy groups and preferably N:N-phthaloyl, further aryl lower alkanoyl radicals such as phenylacetyl or a carbobenzoxy or tertiary or iso-butyloxycarbonyl radicals or a benzenesulphonyl or toluenesulphonyl radical.

In the following examples there are described several preferred embodiments to illustrate the invention. However, it should be understood that the invention is not intended to be limited to the specific embodiments.

EXAMPLE I 2.51 g. of the sodium salt of cephalothin in 35 ml. of methylene chloride to which 1.60 ml. of dimethylaniline had been added is reacted with 0.6 ml. of dimethyldichlorosilane to form the dimethylsilyl esters of cephalothin. After cooling of the resulting solution to about —55° C., 1.35 g. of $PCl_5$ were added during which the temperature rose to —40° C. The temperature is kept at —40° C. for 2¼ hours after which the mixture was cooled to —70° C. Then 0.30 ml. of dimethylaniline was added thereto followed by the addition of 15 ml. of butanol over about 1½ minutes. The temperatures was kept at —40° C. After about 2½ hours, the reaction mixture was poured into a mixture of 33 ml. of water and 16.5 ml. of methanol, after which the pH of the mixture was brought to 3.5 by the addition of ammonium bicarbonate. After about 20 hours storage at 5° C., the precipitate was filtered off. Purification of the product was effected by dissolution in water at a pH of 7.3 and treatment with active carbon. After filtration 1.5 times volume of methanol was added to the aqueous solution after which the pH was brought to 3.5 by addition of 4 N hydrochloric acid. The crystalline product was filtered off after 2 hours storage at about 5° C. to obtain 1.51 gm. (92.5% yield) of 7-amino-cephalosporanic acid.

EXAMPLE II 1.1 ml. of triethylamine, 3.15 ml. of trimethylmonochlorosilane and 6.7 ml. of dimethylaniline were added with stirring to 3.12 g. of anhydrous cephalosporin C suspended in 42 ml. of methylene chloride. After a reaction time of 1 hour, the mixture was cooled to about —60° C., after which 3.3 g. of phosphorus pentachloride were added with thorough stirring. The temperature then rose to about —40° C. After 2½ hours reaction at this temperature, the mixture was cooled to about —70° C. and 0.4 ml. of dimethylaniline and 30 ml. of n-butanol were rapidly added with stirring during which the temperature rose. The temperature was held at —40° C. for 2½ hours. Then the reaction mixture was poured with thorough stirring into a mixture of 33 ml. of water and 16.5 ml. of methanol after which the pH of the mixture was brought at once to 3.5 by addition of ammonium bicarbonate.

After about 20 hours storage at 5° C., the precipitate was filtered off and washed with methylene chloride and acetone.

The purification of the product was effected by dissolution in water at a pH of 7.3 and treatment with active carbon. After filtration, 1.5 times by volume of methanol was added to the aqueous solution after which the pH was brought to 3.5 with the aid of 4 N hydrochloric acid. After storage at about 5° C., the crystalline product was filtered off to obtain 1.86 gm. (91% yield) of 7-aminocephalosporanic acid.

EXAMPLE III 2.80 g. of N-phthaloyl-cephalosporin C were suspended in 40 ml. of methylene chloride and 3.2 ml. of a 20% by weight solution of triethylamine in methylene chloride and 2.85 ml. of dimethylaniline were added thereto. The substantially clear solution was reacted with 0.6 ml. of dimethyldichlorosilane to form the corresponding silyl ester. After a reaction time of 1 hour, the mixture was cooled to $-50°$ C. and 1.4 g. of $PCl_5$ were added. With continued thorough stirring, the temperature was held for 2¼ hours at $-40°$ C. and then the mixture was cooled at $-65°$ C. Then a mixture of 0.2 ml. of dimethylaniline and 25 ml. of n-butanol was rapidly added thereto. The temperature was subsequently held for 2 hours at $-40°$ C. The mixture was then poured into a mixture of 30 ml. of water and 15 ml. of methanol, and the pH was brought to 3.5 with the aid of ammonium bicarbonate. After about 20 hours storage at 5° C., the precipitate was filtered off, washed with acetone-water, (1:1), methylene chloride, and acetone, and dried to obtain 0.73 (84% yield) of 7-aminocephalosporanic acid.

EXAMPLE IV 2.23 g. of the N-ethyl-piperidine salt of N-phenacetyl-3-desacetoxy-7-aminocephalosporanic acid were suspended in 18 ml. of methylene chloride, and after addition of 1.3 ml. of dimethylaniline, 1 ml. of trimethylchlorosilane was added to form the corresponding trimethylsilyl ester. After 1 hour, the mixture was cooled to $-50°$ C. and 1.1 g. of $PCl_5$ were added. For 2¼ hours the temperature was held at $-40°$ C. and then lowered to $-65°$ C. A solution of 0.3 ml. of dimethylaniline and 12 ml. of butanol was added to the cooled mixture and then the temperature was held for 2¼ hours at $-40°$ C. The reaction mixture was poured into a mixture of 35 ml. of water and 17 ml. of methanol, and brought at once to a pH of 3.5 with the aid of ammonium bicarbonate. After about 20 hours storage at 5° C., the precipitate was filtered off, washed with methanol-water (1:1), methylene chloride and acetone, and dried to obtain 0.936 gm. (92% yield) of 3-desacetoxy-7-aminocephalosporanic acid.

Various modifications of the process of the invention may be made without departing from the spirit or scope thereof.

We claim:

1. A process for the production of an amino acid selected from the group consisting of 7-aminocephalosporanic acid and its derivatives which comprises (A) reacting an acylamino acid compound of a formula selected from the group consisting of

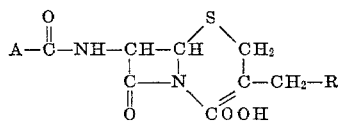
                                  I wherein A is the residue of an organic carboxylic acid of 1 to 18 carbon atoms devoid of the carboxy group, R is selected from the group consisting of acyloxy of an organic carboxylic acid of 1 to 7 carbon atoms, OH and H and metal salts and amine salts thereof with a silyl compound of a formula selected from the group consisting of

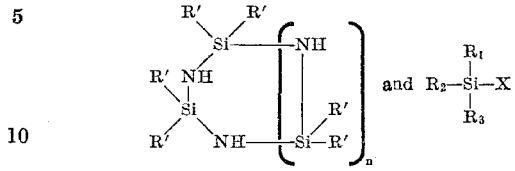

wherein $R_1$, $R_2$ and $R_3$ are selected from the group consisting of hydrogen, halogen, alkyl and haloalkyl of 1 to 7 carbon atoms, phenyl, benzyl, tolyl and dimethylaminophenyl, at least one of the said R's being other than halogen and hydrogen, R' is alkyl of 1 to 7 carbon atoms, n is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the corresponding silyl ester of the said acylamino acid, (B) reacting the said silyl ester under anhydrous conditions with an acid halide as a halogenating agent at a temperature below about 0° C. to form the corresponding imino halide, (C) reacting the said imino halide at a temperature not greater than $-20°$ C. with an alcohol of the formula $R_6OH$ wherein $R_6$ is selected from the group consisting of alkyl of 1 to 12 carbon atoms, phenylalkyl of 1 to 7 alkyl carbon atoms, cyclohexyl, hydroxyalkyl of 2 to 12 carbon atoms, alkoxyalkyl of 3 to 13 carbon atoms, a phenoxyalkyl of 2 to 7 alkyl carbon, a phenylalkoxy alkyl of 2 to 7 alkyl carbon atoms, and hydroxyalkoxyalkyl of 4 to 7 carbon atoms to form the corresponding imino ether and (D) reacting the imino ether under acid conditions with a compound selected from the group consisting of water and a hydroxyl containing compound to form the corresponding free amino acid.

2. A process for the production of 7-aminocephalosporanic acid and its derivatives which comprises (A) reacting an acylamino acid compound selected from the group consisting of a compound of the formula $$\text{Ac-HN-CH-CH} \begin{array}{c} \text{S} \\ \diagdown \\ \diagup \end{array} \text{CH}_2$$
$$\begin{array}{cc} | & | \\ \text{O=C---N} & \text{C-CH}_2\text{-R} \\ & \diagdown \text{C} \diagup \\ & | \\ & \text{COOH} \end{array}$$

wherein Ac is the acyl of an organic carboxylic acid of 1 to 18 carbon atoms, R is selected from the group consisting of acyloxy of an alkanoic acid of 1 to 7 carbon atoms, OH, and H and metal salts and amine salts thereof with a silyl compound of a formula selected from the group consisting of wherein $R_1$, $R_2$ and $R_3$ are selected from the group consisting of hydrogen, halogen, alkyl and haloalkyl of 1 to 7 carbon atoms, phenyl, benzyl, dimethylaminophenyl and tolyl, at least one of the said R's being other than halogen and hydrogen, R' is alkyl of 1 to 7 carbon atoms, $n$ is an integer from 1 to 2 and X is selected from the group consisting of halogen and

and $R_4$ is selected from the group consisting of hydrogen and alkyl of 1 to 7 carbon atoms and $R_5$ is selected from the group consisting of hydrogen, alkyl of 1 to 7 carbon atoms and

to form the corresponding silyl ester of the said acyl-amino acid, (B) reacting the said silyl ester under anhydrous conditions with an acid halide as a halogenating agent at a temperature below about 0° C. to form the corresponding imino halide, (C) reacting under anhydrous conditions the said imino halide at a temperature not greater than —20° C. with an alcohol of the formula $R_6OH$ wherein $R_6$ is selected from the group consisting of alkyl of 1 to 12 carbon atoms, phenylalkyl of 1 to 7 alkyl carbon atoms, cyclohexyl, hydroxyalkyl of 2 to 12 carbon atoms, alkoxyalkyl of 3 to 13 carbon atoms, a phenoxyalkyl of 2 to 7 alkyl carbons, a phenalkoxyalkyl of 2 to 7 alkyl carbons and hydroxyalkoxyalkyl of 4 to 7 carbon atoms to form the corresponding imino ether and (D) reacting the imino ether under acid conditions with water to form 7-aminocephalosporanic acid or derivative thereof.

3. The process of claim 2 wherein the product produced is selected from the group consisting of 7-aminocephalosporanic acid and 3-desacetoxy-7-amino-cephalosporanic acid.

4. The process of claim 3 wherein the acid halide is selected from the group consisting of phosphorus pentachloride, phosphorus pentabromide, phosphorus tribromide and phosphorus oxychloride.

5. The process of claim 4 wherein the acid halide is phosphorus pentachloride.

6. The process of claim 4 wherein the silyl compound is selected from the group consisting of dimethyl dichlorosilane, trimethyl chlorosilane and methyl trichlorsilane.

7. The process of claim 4 wherein the silyl ester is reacted with the acid halide at a temperature from about —10° to —40° C.

8. The process of claim 4 wherein the imino halide is reacted with the alcohol at a temperature of about —40° C.

9. The process of claim 4 wherein the alcohol is an aliphatic alcohol containing from one to five carbon atoms.

10. The process of claim 5 wherein the silyl compound is selected from the group consisting of dimethyl dichlorosilane, trimethyl chlorosilane and methyl trichlorosilane and wherein the silyl ester is reacted with the acid halide at a temperature of about —10° to about —40° C. and wherein the imino halide is reacted with the alcohol at a temperature of about —40° C. and wherein the alcohol is selected from the group consisting of n-butanol and methanol.

11. The process of claim 10 wherein the acylamino acid compound is cephalosporin C.

12. The process of claim 10 wherein the acylamino acid compound is N,N-phthaloyl cephalosporin C.

13. The process of claim 10, wherein Ac is 2-thienylacetyl, phenylacetyl or phenoxyacetyl.

14. The process of claim 13, wherein R is hydrogen.

15. The process of claim 13, wherein R is acetoxy.

References Cited

UNITED STATES PATENTS 3,499,909   3/1970   Weissenburger et al. _ 260—306.7

NICHOLAS S. RIZZO, Primary Examiner

UNITED STATES PATENT OFFICE
CERTIFICATE OF CORRECTION

Patent No. 3,575,970      Dated April 20, 1971

Inventor(s) Helmut Wilhelm Otto Weissenburger et al.

It is certified that error appears in the above-identified patent and that said Letters Patent are hereby corrected as shown below:

Column 1, lines 41 to 45, the formula should appear as shown below:

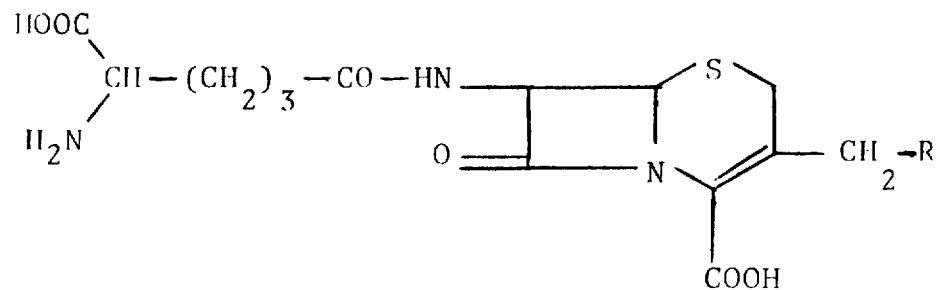

UNITED STATES PATENT OFFICE
CERTIFICATE OF CORRECTION

Patent No. 3,575,970              Dated April 20, 1971

Inventor(s) Helmut Wilhelm Otto Weissenburger   - 2 -

It is certified that error appears in the above-identified patent and that said Letters Patent are hereby corrected as shown below:

Column 7, Formula I should appear as shown below:

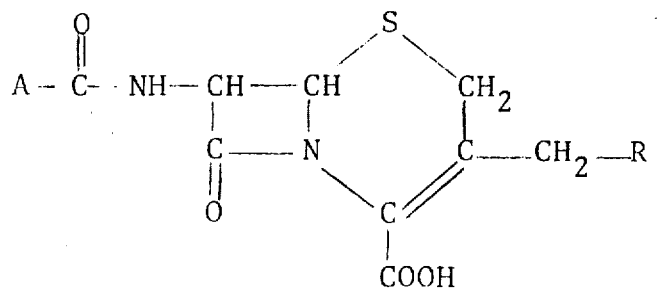

Signed and sealed this 6th day of February 1973.

(SEAL)
Attest:

EDWARD M. FLETCHER, JR.
Attesting Officer

ROBERT GOTTSCHALK
Commissioner of Patents